US008621553B2

(12) United States Patent
Syed et al.

(10) Patent No.: US 8,621,553 B2
(45) Date of Patent: Dec. 31, 2013

(54) MODEL BASED SECURITY FOR CLOUD SERVICES

(75) Inventors: Saad Syed, Redmond, WA (US); Chetan Shankar, Bothell, WA (US); Jose M. Bernabeu-Auban, Sammamish, WA (US); Sushant P. Rewaskar, Redmond, WA (US); Muhammad Umer Azad, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 12/415,079

(22) Filed: Mar. 31, 2009

(65) Prior Publication Data

US 2010/0251328 A1 Sep. 30, 2010

(51) Int. Cl.
| G06F 17/00 | (2006.01) |
| G06F 7/04 | (2006.01) |
| G06F 21/00 | (2013.01) |
| H04L 29/06 | (2006.01) |
| H04L 9/32 | (2006.01) |

(52) U.S. Cl.
USPC ........ 726/1; 726/2; 726/26; 726/27; 713/151; 713/164; 713/168; 713/182

(58) Field of Classification Search
USPC .............. 726/1, 2, 26, 27; 713/151, 164, 168, 713/182
See application file for complete search history.

(56) References Cited

U.S. PATENT DOCUMENTS

| 7,983,900 | B2 * | 7/2011 | Moyle | 704/9 |
| 8,108,912 | B2 * | 1/2012 | Ferris | 726/3 |
| 2003/0191810 | A1 | 10/2003 | Muhlestein et al. | |
| 2007/0039053 | A1 | 2/2007 | Dvir | |
| 2008/0082448 | A1 | 4/2008 | Meijer et al. | |
| 2008/0083031 | A1 | 4/2008 | Meijer et al. | |
| 2008/0104699 | A1 | 5/2008 | Gounares et al. | |
| 2008/0109343 | A1 | 5/2008 | Robinson et al. | |
| 2008/0299951 | A1 | 12/2008 | Karkanias et al. | |
| 2009/0300719 | A1 * | 12/2009 | Ferris | 726/3 |
| 2010/0082979 | A1 * | 4/2010 | Edwards | 713/168 |
| 2010/0131949 | A1 * | 5/2010 | Ferris | 718/1 |
| 2010/0132016 | A1 * | 5/2010 | Ferris | 726/4 |
| 2010/0217850 | A1 * | 8/2010 | Ferris | 709/223 |
| 2010/0235887 | A1 * | 9/2010 | Burch et al. | 726/4 |
| 2011/0167474 | A1 * | 7/2011 | Sinha et al. | 726/1 |
| 2012/0005724 | A1 * | 1/2012 | Lee | 726/1 |

FOREIGN PATENT DOCUMENTS

WO     2005006027 A1     9/2000

OTHER PUBLICATIONS

Foster et al., "Globus: A Metacomputing Infrastructure Toolkit", pp. 1-15 ftp://ftp.globus.org/pub/globus/papers/globus.pdf.
Stark, Scott, "Integrate security infrastructures with JBossSX", JavaWorld.com, Aug. 21, 2001, http://www.javaworld.com/javaworld/jw-08-2001/jw-0831-jaas.html.
Sharma, Alolita, "Cloud Computing and Open Source", Aug. 8, 2008, pp. 1-5 http://www.technetra.com/2008/08/08/cloud-computing-and-open-source/.

* cited by examiner

*Primary Examiner* — Mohammed W Reza
(74) *Attorney, Agent, or Firm* — Microsoft Corporation (57) ABSTRACT

Applications, such as cloud services, may be deployed within a network environment (e.g., a cloud computing environment). Unfortunately, when the applications are instantiated within the network environment, they have the ability to compromise the security of other applications and/or the infrastructure of the network environment. Accordingly, as provided herein, a security scheme may be applied to a network environment within which an application is to be instantiated. The security scheme may comprise one or more security layers (e.g., virtual machine level security, application level security, operating system level security, etc.) derived from an application service model describing the application and/or resources allocated to the application.

20 Claims, 8 Drawing Sheets

FIG. 8

MODEL BASED SECURITY FOR CLOUD SERVICES

BACKGROUND

Cloud computing generally refers to the practice of a user executing and/or receiving services (e.g., run applications, store data, etc.) over a network environment (e.g., the internet). When a service is instantiated within the network environment, it has the ability to compromise the security of other services and/or the infrastructure of the network environment. Security may be compromised on a network level as well as a local level. Current security techniques may not take into account the variety of services and their respective resources requirements. This may allow undesirable activity within the network environment because the security techniques fail to properly secure services based upon their respective allocated resources.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for applying a security scheme (e.g., a model based security scheme for cloud services) to a network environment within which an application (e.g., a cloud service) is to be instantiated is disclosed herein. A security scheme may be created based upon an application service model corresponding to an application which is to be instantiated within a network environment (e.g., a cloud computing environment configured to host cloud services). It may be appreciated that the term application as provided herein may be broadly interpreted to comprise not only computer applications, but also cloud services, web services, web pages, and/or other source code.

The security scheme may be derived from the application service model, which may comprise an application description (e.g., a description of the application and other associated constituent applications) and a resource allocation plan (e.g., CPU allocation, memory allocation, network endpoints, etc.). The security scheme may comprise limitations and/or restrictions (e.g., restrictions of execution privileges, restrictions of computing resources, limitations of computing resources, etc.), which may be enforced upon the application. In one example, the application may be allocated 1 GB of memory; therefore, the security scheme may enforce a limitation of 1 GB of memory for the application. In another example, the application may be restricted from accessing network endpoints not associated with the application as specified within the application service model. Among other things, the security plan may comprise a network filter security, a virtual machine security, an operating system security, a file security, a file resource management security, an endpoint security, a virtual account security, a process security, and/or an application security. The security plan may be applied to the network environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

As cloud computing environments become more prevalent, developers may create cloud services that users may access and execute from within the cloud computing environment. Unfortunately, the cloud services may inadvertently or otherwise compromise the security of other cloud services and/or the infrastructure of the cloud computing environment. In one example, a cloud service may attempt to access resources (e.g., memory) allocated to a second cloud service, thus possibly causing errors in the execution of the second cloud service. In another example, a cloud service (e.g., execution code associated a banking web page) may be associated with a particular end point (e.g., a banking web page accessible to users). If the cloud service receives information from an unassociated end point (e.g., a second banking web page), then security may be compromised. It may be appreciated that a cloud service does not have to be associated with an endpoint.

Current security techniques may not utilize a model based approach to creating a security scheme for a cloud computing environment, thus falling short of providing adequate security based upon a description of the cloud service and/or resources allocated to the cloud service. This limits the ability to create a configurable security scheme based upon a model describing the cloud service and its allocated resources (e.g., additional special interfaces may be needed to achieve adequate security).

Among other things, a technique for applying a security scheme to a network environment within which an application is to be instantiated is provided herein. An application service model (e.g., a description of resources allocated by a scheduler to an application) may be utilized in creating a security scheme. The security scheme may comprise one or more security layers derived from the application service model. For example, security layers may be configured with limitations and restrictions derived from an application description and/or a resource allocation plan within the application service model. In one example, a security scheme may comprise one or more security layers used to enforce limitations and restrictions upon an application within the network environment. The security scheme may enforce the limitations and restrictions through particular security layers (e.g., network filters, virtual machine security, process security, etc.) to allow the application to access allocated resources for proper functioning, while restricting and/or limiting access to resources that are not allocated to the application. The security may also protect an application from illegal access by other applications. That is, the security scheme may employ security layers configured to protect an application by restricting and/or limiting other applications from accessing (e.g., interfering with) the application and/or its allocated resources. In addition, the security may also protect an application from illegally accessing other applications. That is, the security scheme may employ security layers configured to inhibit an application from accessing other applications by restricting and/or limiting this applications from accessing (e.g., interfering with) other applications and/or its allocated resources.

Figure 1:
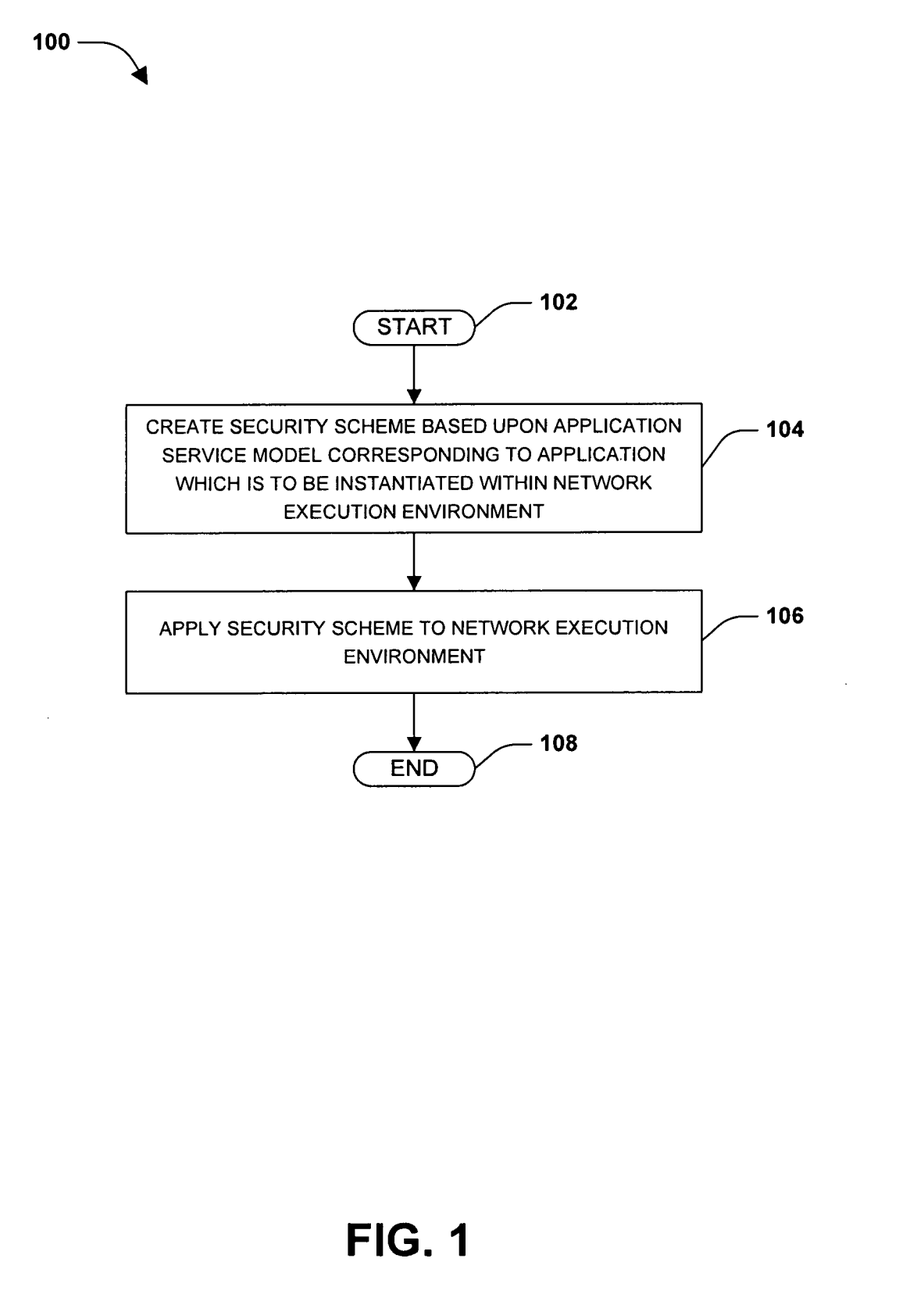
FIG. 1 is a flow chart illustrating an exemplary method of applying a security scheme to a network environment within which an application is to be instantiated.

One embodiment of applying a security scheme to a network environment within which an application is to be instantiated is illustrated by an exemplary method 100 in FIG. 1. At 102, the method begins. At 104, a security scheme may be created based upon an application service model corresponding to an application (e.g., a cloud service) which is to be instantiated within the network environment (e.g., a cloud computing environment). The application service model describes what computing resources and/or other services the application may access during execution. The application service model may comprise an application description and/or a resource allocation plan. The application description may comprise a description of the application and/or one or more constituent applications. For example, a banking application may describe its own functionality and information regarding a database the banking application may be access. The resource allocation plan, for example, may comprise a CPU allocation, a disk size allocation, network endpoints, memory allocation, and/or other resource allocations (e.g., resource allocations designated by a scheduler).

The security scheme may comprise limitations and/or restrictions that may be enforced upon the application. In one example, a CPU usage limitation may be derived from the resource allocation plan that allocated a particular amount of CPU usage. The security scheme may enforce the CPU usage limitation, so that the application does not use more CPU than its allotted share. This may allow other applications to use their allotted share of CPU usage. In another example, the application description may describe a database the application will be accessing. The security scheme may restrict the application from accessing other databases not described within the application description. In this manner, a banking application, for example, may not access a second database not owned by the bank, thus mitigating unauthorized attempts at accessing the second database.

The security scheme may comprise one or more security layers (e.g., security techniques for enforcing particular limitations and/or restrictions, thus sandboxing applications within the networking environment). In one example, the security scheme may comprise a network filter security (e.g., a firewall). The network filter security may be configured to isolate resources of a virtual machine within which the application is to be instantiated. For example, a virtual machine may be created within a physical machine. The virtual machine may host one or more applications through an operating system. The network filter security may be configured, for example, to restrict the virtual machine from accessing network endpoints not described within the application service model.

The security scheme may comprise a virtual machine security (e.g., security associated with a virtual machine within which the application is to be instantiated). In one example, the virtual machine security may isolate the application's role into one or more virtual machines as desired. In another example, the virtual machine security may define resource access of the virtual machine, which may be derived from the application service model.

The security scheme may comprise an operating system security (e.g., security corresponding to an operating system within a virtual machine within which the application is to be instantiated). In one example, the operating system security may define access to system resources (e.g., system file, registry, disk resources, etc.) derived from the application service model. In another example, the operating system security may control privileges available to a particular virtual account associated with the application. In yet another example, access to endpoints may be restricted through the operating system security.

The security scheme may comprise a file security (e.g., security within the operating system corresponding to memory allocation). In one example, the file security may define access to files, directories, volume resources, memory allocation, etc. derived from the application service model.

The security scheme may comprise a file resource management security. The file resource management security may define file size limitations (e.g., quotas on disk resources) derived from the application service model. In this manner, the application may not consume more disk resources than what was allocated to the application.

The security scheme may comprise an endpoint security. The endpoint security may restrict access to one or more network endpoints. For example, a bank application would be restricted from opening a port to a web page (e.g., a network endpoint) that is not associated with the bank application.

The security scheme may comprise a virtual account security. The virtual account security may restrict the application from accessing operating system specific operations and resources not specified in the application security model. This restricts the application from accessing privileged operations that may crash other applications within the operating system (e.g., the operating system of the virtual machine within which the application is to be instantiated).

The security scheme may comprise a process security (e.g., a job object). The process security, for example, may be derived from the resource allocation plan within the application service model. In one example, the process security may define memory restrictions, CPU limitations, and/or access to global objects. Because more than one application may be instantiated within a virtual machine, respective applications within the virtual machine may have their own particular process security enforced upon them. In this manner, applications may not access other application's resources within the virtual machine environment (e.g., application A may be restricted from accessing memory and/or network endpoints allocated to application B).

The security scheme may comprise an application security (e.g., code access security). The application security may be configured to restrict the application from accessing operating system resources and/or executing particular privileged operations as specified in the application service model. In one example, the application security may define access to particular operating system resources and/or may control privileges associated with the execution of particular APIs (e.g., the application security may control privileges associated with code executed in a common language runtime).

In addition to the foregoing, it may be appreciated that the security scheme may comprise other security techniques and/or configurations that could be used, and that the claimed subject matter is generally intended to comprise the same. At 106, the security scheme may be applied to the network execution environment. At 108, the method ends.

Figure 2:
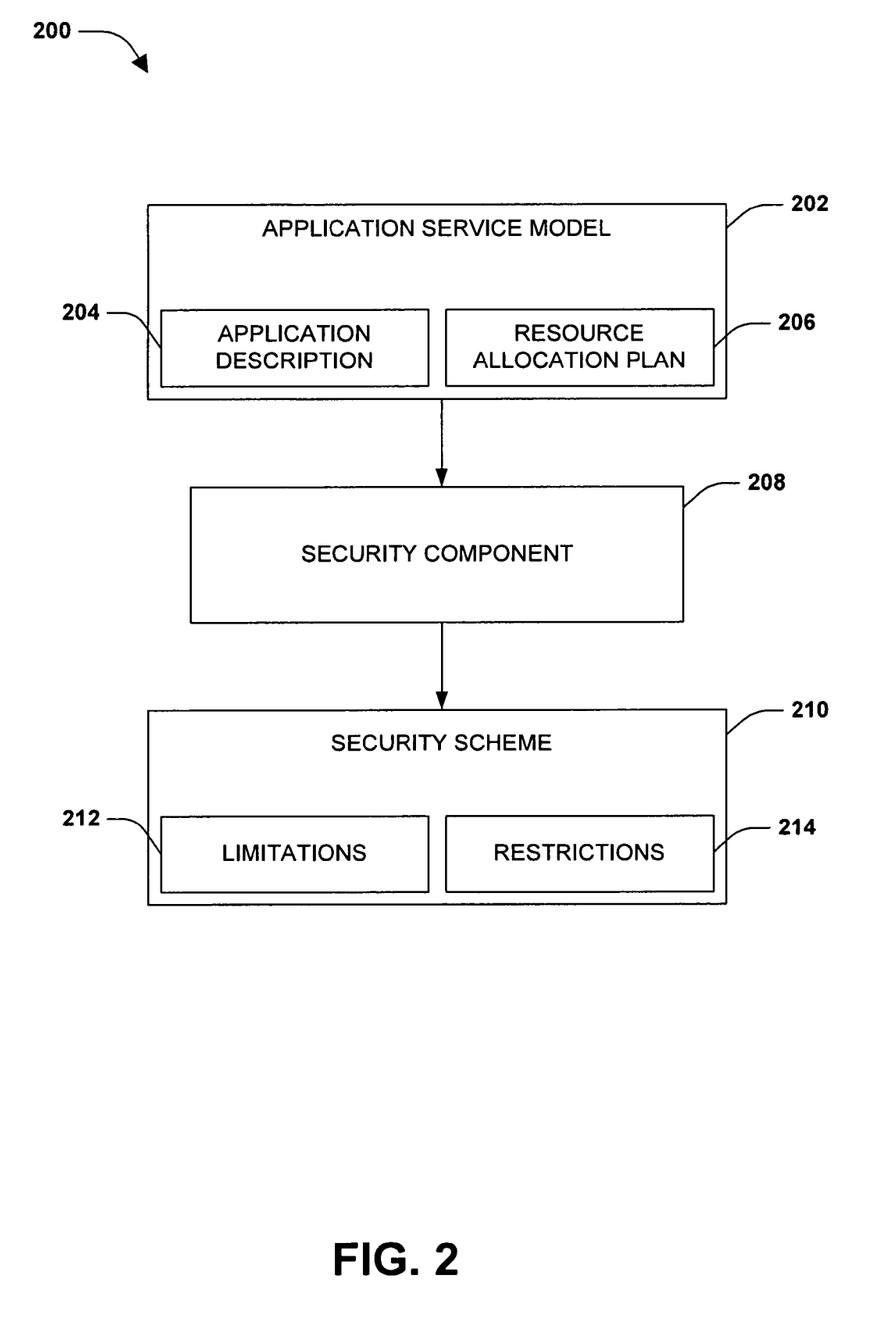
FIG. 2 is a component block diagram illustrating an exemplary system for applying a security scheme to a network environment within which an application is to be instantiated.

FIG. 2 illustrates an example 200 of a system configured for applying a security scheme to a network environment within which an application is to be instantiated. The system may comprise a security component 208 configured to create a security scheme 210 based upon an application service model 202 corresponding to an application which is to be instantiated within a network environment. The application service model 202 may comprise an application description 204 and/or a resource allocation plan 206. The security component 208 may derive limitations 212 and/or restrictions 214 of computing resources, which may be enforced through the security scheme when applied to the network environment. The security component 208 may be configured to apply the security scheme 210 to the network environment.

In one example, the resource allocation plan 206 within the application service model 202 may describe memory allocation, CPU allocation, disk size allocations, and/or other resource allocations. The application description 204 within the application service model 202 may describe what functionality the application may perform and/or other services (e.g., a database) the application may access within the network environment (or outside of the network environment). The security component 208 may derive the restrictions 214 based upon resources and/or functionality not allocated to the application within the resource allocation plan 206 and/or the application description 204. For example, the application may be restricted from accessing services, disk files, network endpoints, etc. not associated with the application. The security component 208 may derive the limitations 212 based upon resource allocations and/or functionality limitations within the resource allocation plan 206 and/or application description 204 (e.g., the application is limited to 1 GB of memory, the application is limited to a specific CPU usage, etc.).

It may be appreciated that the application may be instantiated within a virtual machine, wherein the enforcement (e.g., applying the security scheme to the network environment) of the security scheme may be accomplished through a variety of security layers (e.g., operating system security, virtual machine security, network filter security, etc.).

Figure 3:
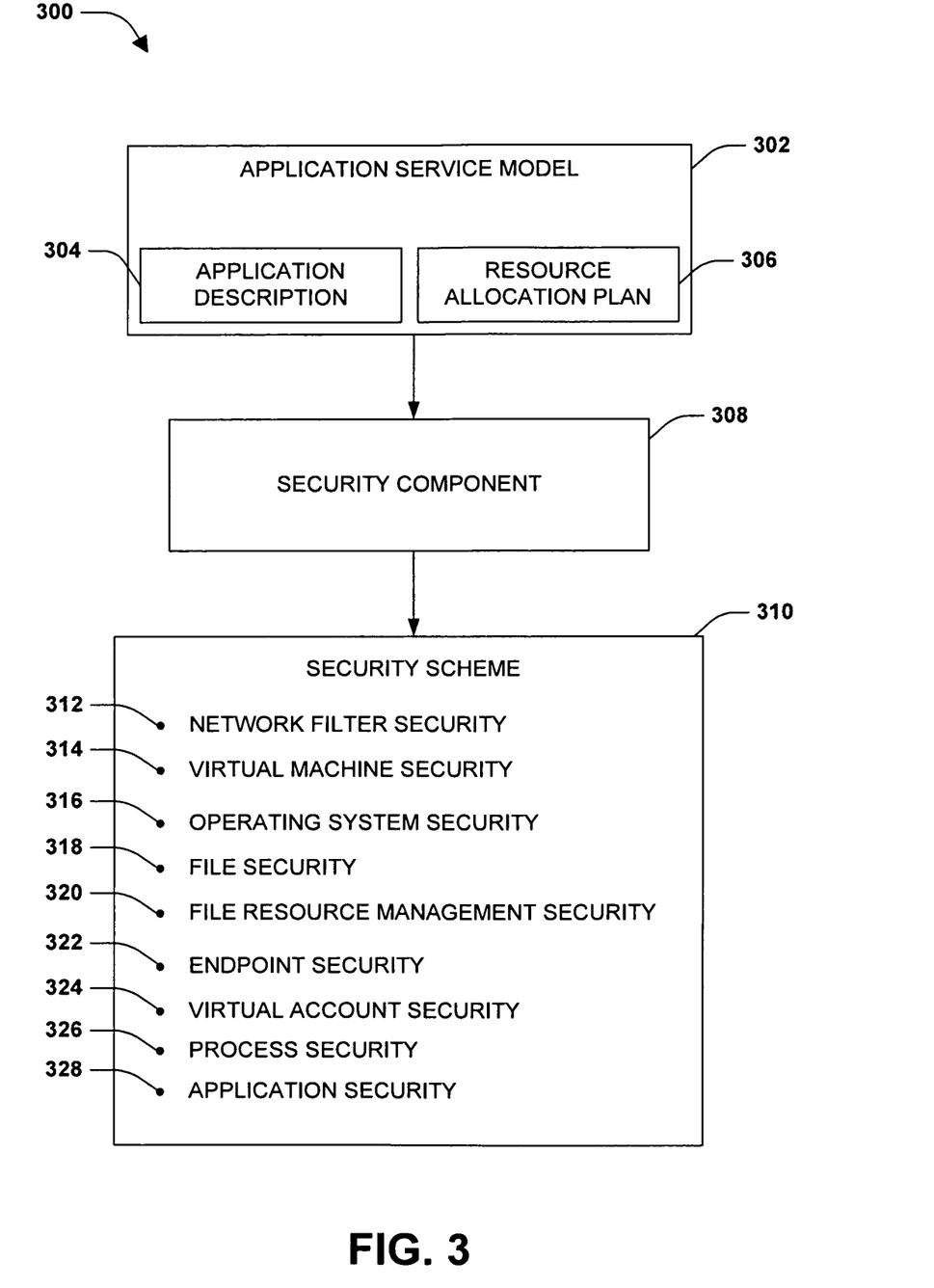
FIG. 3 is an illustration of an example of creating a security scheme.

FIG. 3 illustrates an example 300 of creating a security scheme. A security component 308 may be configured to create a security scheme 310 based upon an application service model 302 corresponding to an application which is to be instantiated within a network environment. The application service model 302 may comprise an application description 304 and/or a resource allocation plan 306. The security component 308 may create and configure one or more security layers that may be implemented within the security scheme 310. The security layers may be created and configured based upon the application service model 302, the application description 304, the resource allocation plan 306, and/or limitations and restrictions comprised therein.

In one example, the security scheme 310 may comprise a network filter security 312 (e.g., isolates resources of a virtual machine in which the application is to be instantiated), a virtual machine security 314 (e.g., define resource access of a virtual machine), an operating system security 316 (e.g., define access to operating system resources), a file security 318 (e.g., define access to files, directories, and volume resources), a file resource management security 320 (e.g., define file size limitations), an endpoint security 322 (e.g., define access to one or more network endpoints), a virtual account security 324 (e.g., restrict application from accessing operating system specific operations and resources not specified in the application security model), a process security 326 (e.g., define memory access, CPU limits, and global object access), an application security 328 (e.g., define access to particular APIs and/or restrictions to particular resources), and/or other security layers that may be applicable. The security component 308 may apply the security scheme 310 to the network environment (e.g., apply the operating system security 316 to a operating system hosting the application, apply the virtual machine security 314 to a virtual machine hosting the application, etc.).

Figure 4:
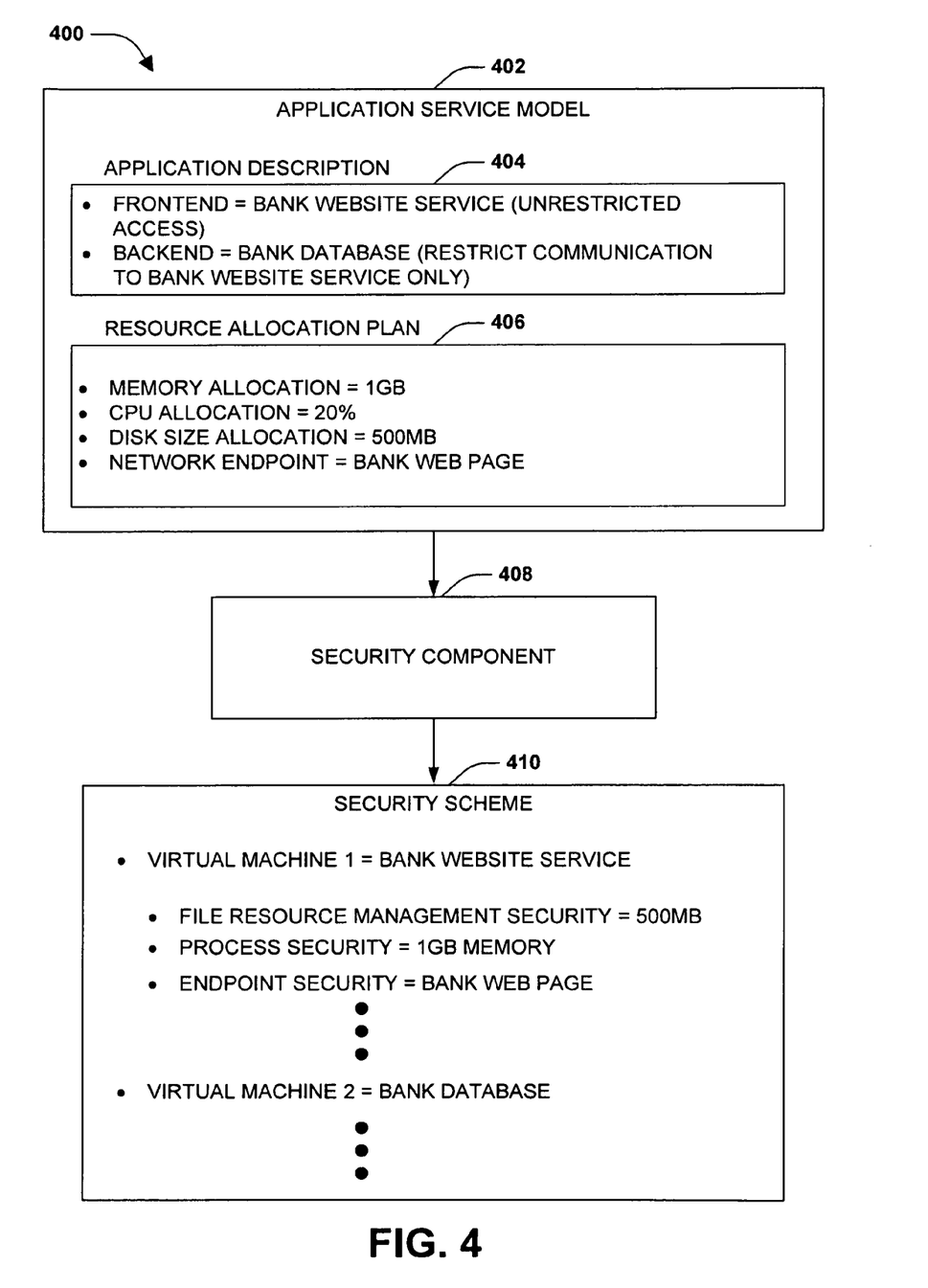
FIG. 4 is an illustration of an example of creating a security scheme.

FIG. 4 illustrates an example 400 of creating a security scheme. A security component 408 may receive an application service model 402 corresponding to an application that is to be instantiated within a network environment. The application service model 402 may comprise an application description 404 and/or a resource allocation plan 406. The application description 404 may describe the application and one or more constituent applications (e.g., a bank website service as a frontend of the application and a bank database as a backend of the application along with particular security access information). The resource allocation plan 406 may describe resource allocation limitations and/or restrictions (e.g., 1 GB memory allocation, 20% CPU allocation, 500 MB disk size allocation, and a bank web page network endpoint).

The security component 408 may create a security scheme 410 based upon the application service model 402 (e.g., the application description 404 and the resource allocation plan 406). The security scheme 410 may designate a virtual machine 1 to the bank website service (front end) and a virtual machine 2 to the bank database (backend). The security scheme 410 may comprise one or more security layers used to enforce the security scheme within the network environment (e.g., comprising the virtual machine 1 and the virtual machine 2) within which the application is to be instantiated. For example, a file resource management security may be configured to limit the frontend of the application (bank website service) to 500 MB. A process security may be configured to limit the frontend of the application (bank website service) to 1 GB memory and restrict the frontend of the application to specific memory ranges. An endpoint security may be configured to restrict the frontend of the application from accessing network endpoints other than the bank web page. Security layers may define security for the backend of the application (bank database within the virtual machine 2). The backend may also be configured to prevent anyone other than the front end from accessing it. It may be appreciated that other security layers may be configured within the security scheme 410 and that the security layers within the security scheme 410 may comprise additional configuration.

Figure 5:
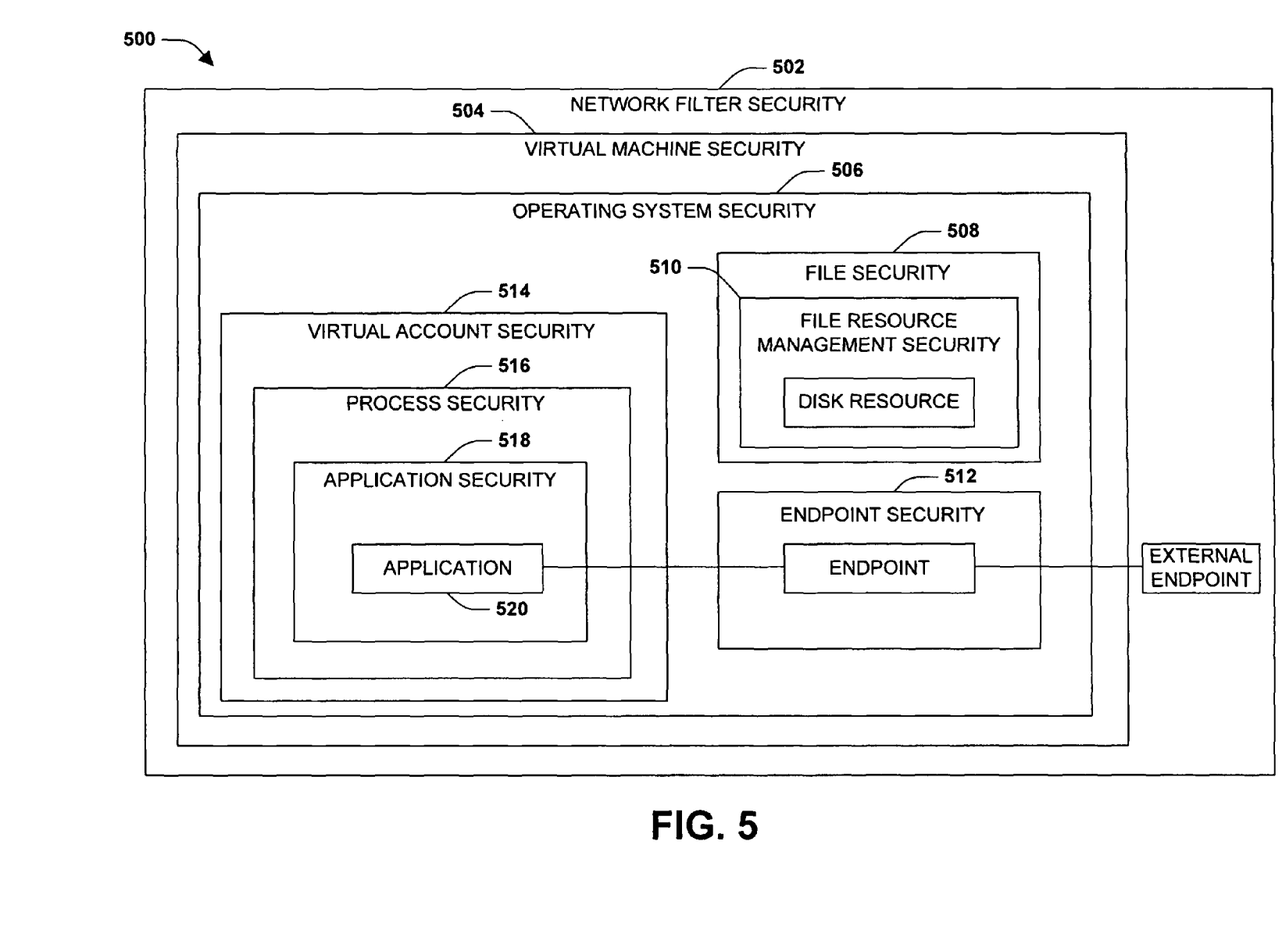
FIG. 5 is an illustration of an example of applying a security scheme to a network environment within which an application is to be instantiated.

FIG. 5 illustrates an example 500 of applying a security scheme to a network environment within which an application is to be instantiated. Within the network environment, one or more security layers of a security scheme may be applied. In one example, a network filter security 502 layer may be applied to isolate resources of a virtual machine within which an application 520 is to be instantiated (e.g., a network firewall on one or more physical machines within the network environment). A virtual machine security 504 may be applied to define resource access of a virtual machine in which the application 520 is to be instantiated. Because a physical machine may host multiple virtual machines, it may be advantageous to enforce security amongst the virtual machines. An operating system security 506 may be applied to defined access to system resources. Because an operating system of a virtual machine may host multiple applications, it may be advantageous to enforce security among applications at an operating system level.

A file security 508 may be applied to define access to files, directories, and volume resources (e.g., security applied to an NTFS file system within the operating system hosting the application). A file resource management security 510 may be applied to define file size limitations. An endpoint security 512 can be applied to define access to one or more network endpoints (e.g., an external endpoint that a user may use to access the application).

A virtual account security 514 may be applied to restrict the application 520 from accessing operating system specific operations and resources not specified in the application security model. A process security 516 may be applied to define memory access, CPU limits, and/or global object access for a particular application (e.g., the application 520). It may be appreciated that particular process securities may be applied to respective applications within a virtual machine to limit and/or restrict the application from accessing another application's resources. An application security 518 may be applied to control access to particular resources (e.g., operating system resources specified within an application service model) and/or execution of particular privileged operations (e.g., API execution, code executed in a common language runtime, etc.)

Figure 6:
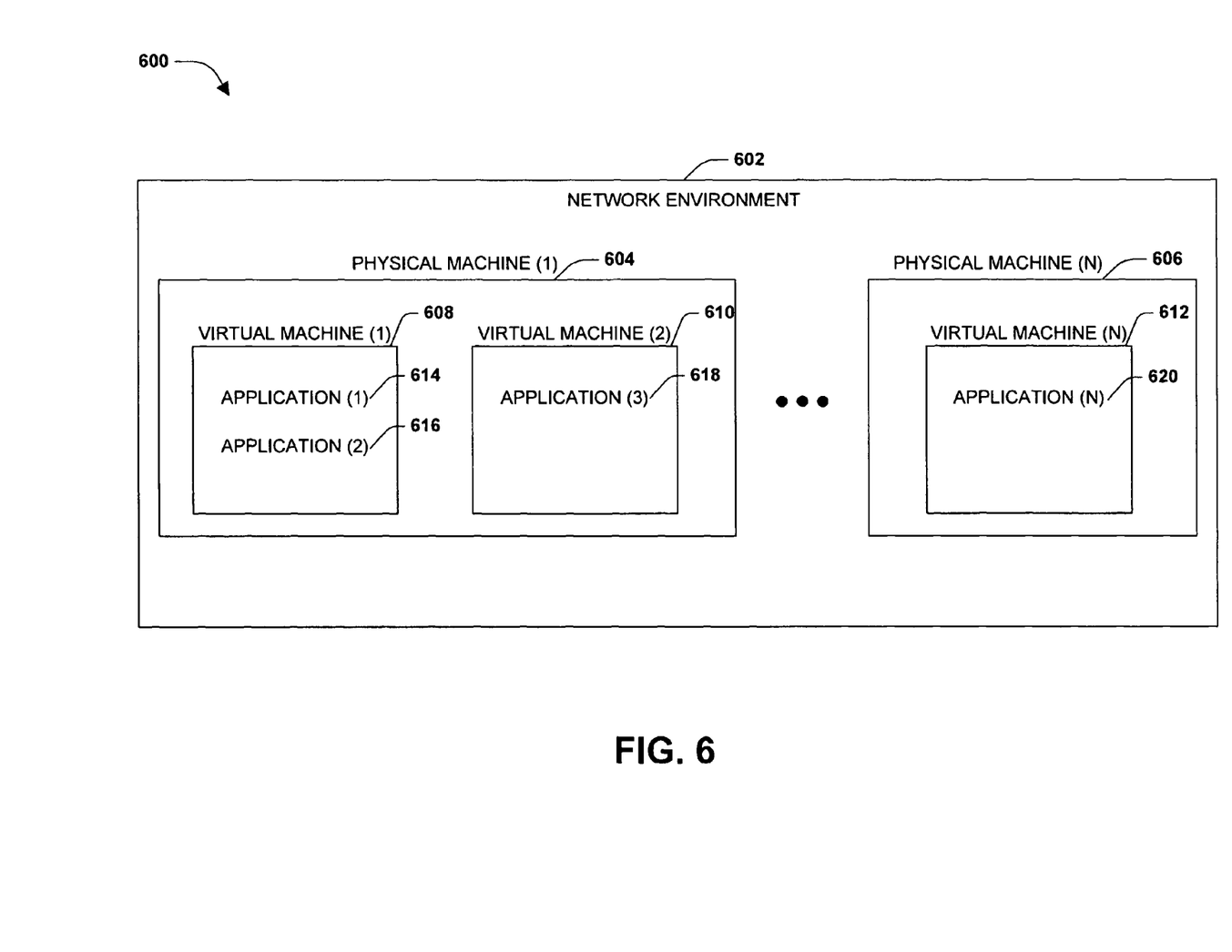
FIG. 6 is an illustration of an example of a network environment within which a security scheme may be applied.

FIG. 6 illustrates an example 600 of a network environment within which a security scheme may be applied. A network environment 602 may comprise one or more physical machines (e.g., a physical machine (1) 604 up to a physical machine (N) 606 where N is an integer value greater than 0). For example, a data center comprising multiple physical machines may be configured as a cloud computing environment. The physical machines may be configured to host one or more applications (e.g., cloud computing services). Because the applications may compromise the security of other applications and/or the infrastructure of the network environment 602, a security scheme may be created and applied to the network environment.

In one example, a virtual machine (1) 608 may be created to host an application (1) 614 and an application (2) 616 within the physical machine (1) 604. A virtual machine (2) 610 may be created to host an application (3) 618 within the physical machine (1) 604. It may be appreciated that other physical machines, virtual machines, and/or applications may exist within the network environment 602 (e.g., a physical machine (N) 606, a virtual machine (N) 612, and an application (N) 620). Security layers may be applied to respective physical machines, virtual machines, operating environments within the virtual machines, applications, and/or other computing resources and components within the network environment 602. The security layers may be applied based upon particular application service models of respective applications, thus mitigating security compromises between applications and/or the infrastructure of the network environment 602.

Figure 7:
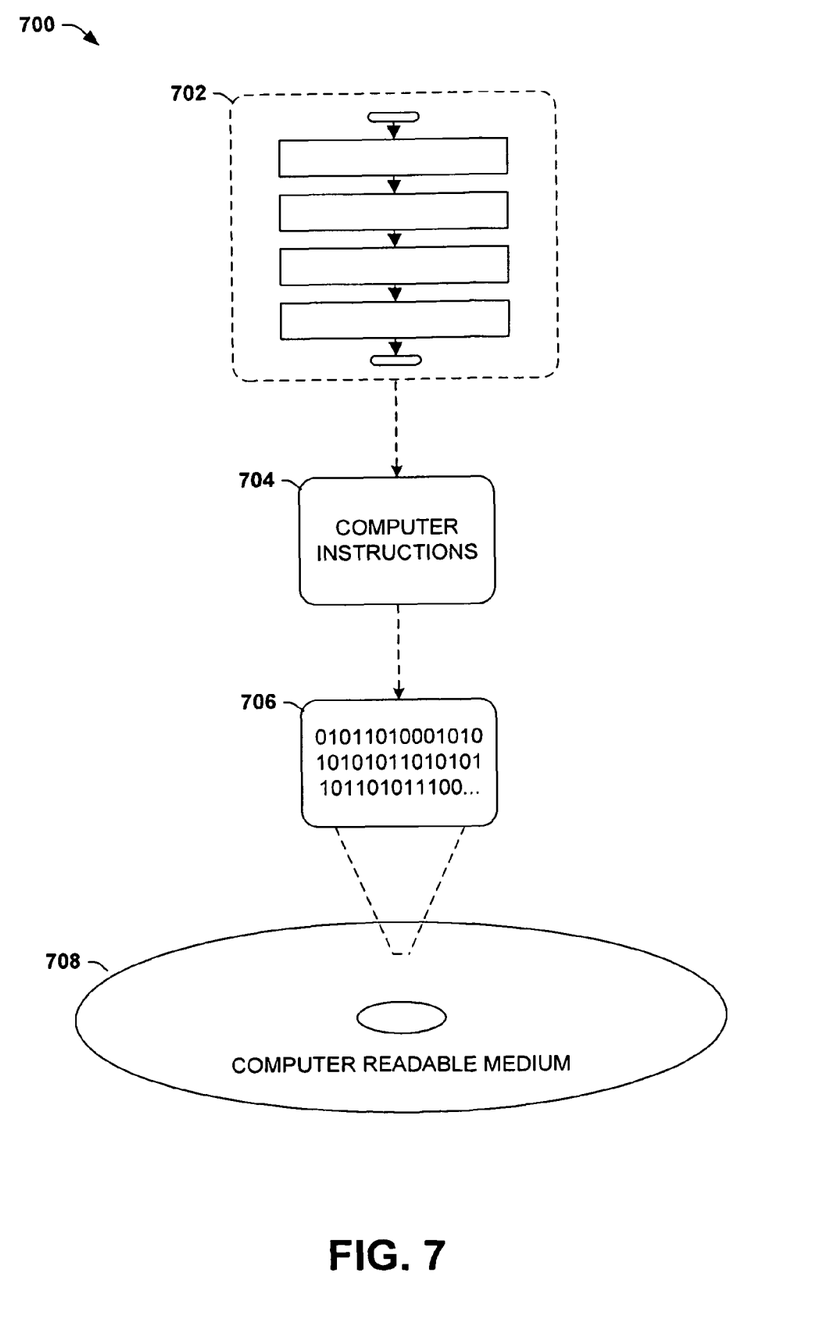
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 700, the set of computer instructions 704 may be configured to perform a method 702, such as the exemplary method 100 of FIG. 1, for example. In another such embodiment, the set of computer instructions 704 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
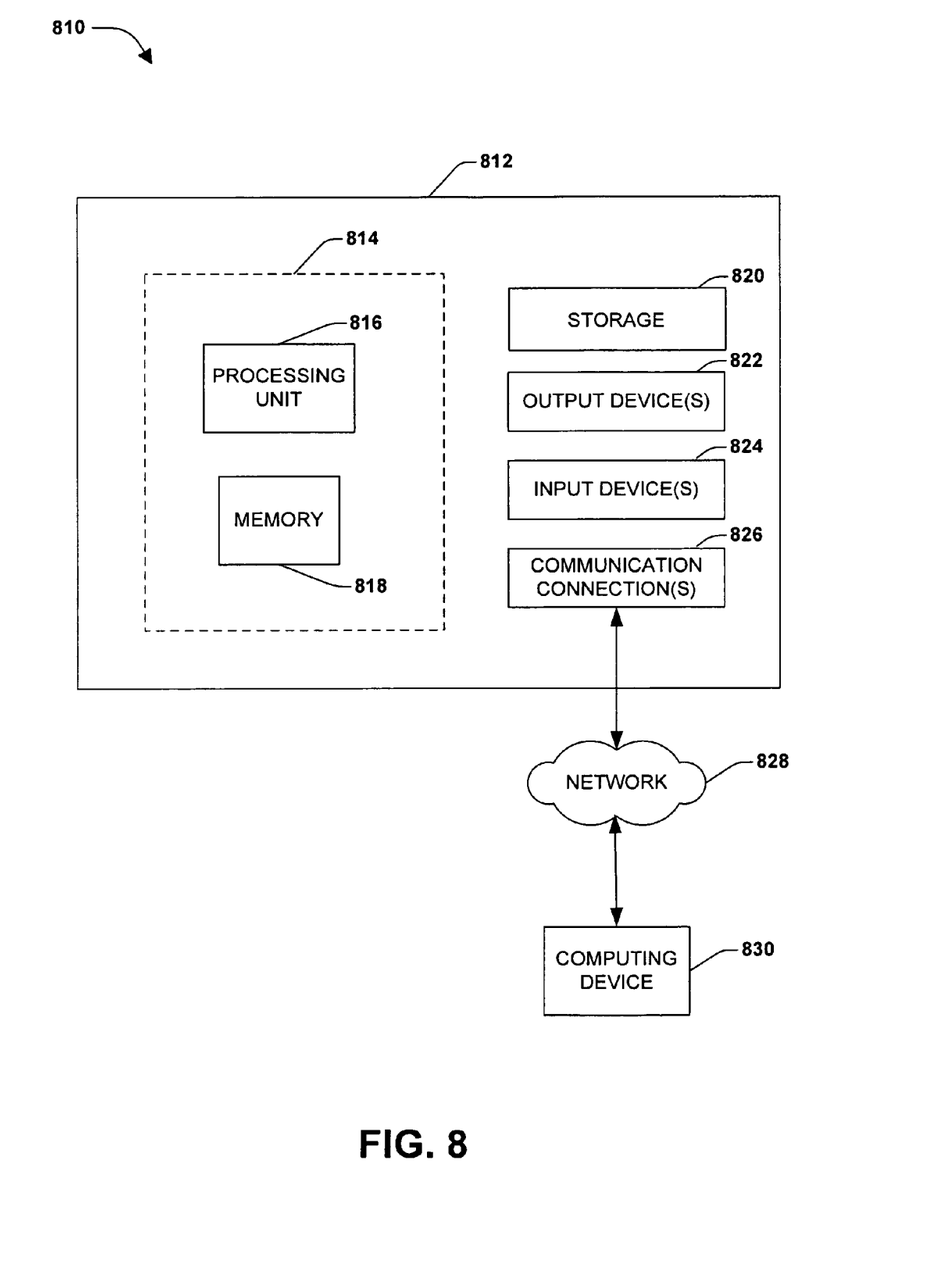
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for applying a security scheme to a network environment within which an application, comprising a cloud service, is to be instantiated, comprising:
    creating the security scheme based upon an application service model for the application comprising the cloud service that is to be instantiated within the network environment, the security scheme comprising a virtual machine security derived from the application service model, the virtual machine security:
        designating a role of the cloud service to a virtual machine within which the cloud service is to be instantiated; and
        defining virtual machine resource access, for the cloud service, to one or more resources of the virtual machine;
    instantiating the cloud service within the virtual machine hosted by the network environment; and
    applying the security scheme to the network environment, the applying comprising enforcing the virtual machine security upon the cloud service instantiated within the virtual machine, the enforcing comprising:
        isolating the role of the cloud service to the virtual machine; and
        enforcing the virtual machine resource access upon the cloud service.

2. The method of claim 1, the application service model comprising an application description and a resource allocation plan.

3. The method of claim 2, the resource allocation plan comprising an identifier of a database that the cloud service is to access.

4. The method of claim 2, the application description comprising a description of the application and one or more constituent applications, and the applying the security scheme comprising:
    restricting application access of the application to the one or more constituent applications.

5. The method of claim 1, the applying the security scheme comprising:
    enforcing one or more limitations of computing resources upon the cloud service;
    enforcing one or more restrictions of computing resources upon the cloud service; and
    enforcing one or more restrictions of execution privilege upon the cloud service.

6. The method of claim 1, the creating a security scheme comprising:
    deriving a network filter security configured to isolate resources of the virtual machine within which the cloud service is to be instantiated.

7. The method of claim 1, the creating a security scheme comprising:
    deriving an operating system security configured to define access to system resources based upon the application service model.

8. The method of claim 1, the creating a security scheme comprising:
    deriving a file resource management security configured to define file size limitations based upon the application service model.

9. The method of claim 1, the creating a security scheme comprising:
    deriving an endpoint security configured to define access to one or more network endpoints based upon the application service model.

10. The method of claim 1, the creating a security scheme comprising:
    deriving a virtual account security configured to restrict the cloud service from accessing operating system operations and operating system resources not specified in the application security model.

11. The method of claim 1, the creating a security scheme comprising:
    deriving an application security configured to:
        restrict access to operating system resources; and
        restrict execution of privileged operations specified within the application service model.

12. A system for applying a security scheme to a network environment within which an application, comprising a cloud service, is to be instantiated comprising:
    a security component configured to:
        create the security scheme based upon an application service model for the application comprising the cloud service that is to be instantiated within the network environment, the security scheme comprising a file resource management security derived from the application service model, the file resource management security defining a file size limitation for the cloud service;
        instantiate the cloud service within a virtual machine hosted by the network environment;
        apply the security scheme to the network environment; and
        enforce the file resource management security upon the cloud service instantiated within the virtual machine, comprising:
            restricting the cloud service from maintaining a file comprising a size greater than the file size limitation.

13. The system of claim 12, the security scheme configured to:
    enforce one or more limitations of computing resources upon the cloud service; and
    enforce one or more restrictions of computing resources upon the cloud service.

14. The system of claim 12, the security scheme comprising:
    a network filter security configured to isolate resources of the virtual machine within which the cloud service is to be instantiated.

15. The system of claim 12, the security scheme comprising:
an operating system security configured to define access to operating system resources based upon the application service model.

16. The system of claim 12, the security scheme comprising:
a file security configured to define access to files, directories, and volume resources based upon the application service model.

17. The system of claim 12, the security scheme comprising:
an endpoint security configured to define access to one or more network endpoints based upon the application service model.

18. The system of claim 12, the security scheme comprising:
a virtual account security configured to restrict the cloud service from accessing operating system operations and operating system resources not specified in the application security model.

19. The system of claim 12, the security scheme comprising:
a process security configured to define global object access within the virtual machine based upon a resource allocation plan.

20. A method for applying a security scheme to a network environment within which an application is to be instantiated comprising:
creating the security scheme based upon an application service model corresponding to the application which is to be instantiated within the network environment, the security scheme comprising:
a network filter security configured to isolate resources of a virtual machine in which the application is to be instantiated;
a virtual machine security configured to define resource access of the virtual machine;
an operating system security configured to define access to system resources based upon the application service model;
a file security configured to define access to files, directories, and volume resources based upon the application service model;
a file resource management security configured to define file size limitations based upon the application service model;
an endpoint security configured to define access to one or more network endpoints based upon the application service model;
a virtual account security configured to restrict the application from accessing operating system specific operations and resources not specified in the application security model;
a process security configured to define at least one of memory access, CPU limits, or global object access within the virtual machine based upon the resource allocation plan; and
an application security configured to:
restrict access to operating system resources; and
restrict execution of privileged operations specified within the application service model; and
apply the security scheme to the network environment.

\* \* \* \* \*